(12) United States Patent
Tsai

(10) Patent No.: US 6,432,542 B1
(45) Date of Patent: Aug. 13, 2002

(54) MULTICOMPONENT STRUCTURES HAVING IMPROVED ADHESION

(75) Inventor: Mingliang Lawrence Tsai, Holmdel, NJ (US)

(73) Assignee: AlliedSignal Inc., Morris Township, NJ (US)

(*) Notice: Subject to any disclaimer, the term of this patent is extended or adjusted under 35 U.S.C. 154(b) by 0 days.

(21) Appl. No.: 09/161,369

(22) Filed: Sep. 28, 1998

Related U.S. Application Data

(60) Provisional application No. 60/064,482, filed on Nov. 6, 1997.

(51) Int. Cl.[7] .................... B32B 27/00; B32B 27/08
(52) U.S. Cl. .................... 428/421; 428/422; 428/515; 428/518; 428/520
(58) Field of Search ................ 428/515, 421, 428/520, 422, 518

(56) References Cited

U.S. PATENT DOCUMENTS

| | | | | |
|---|---|---|---|---|
| 3,480,580 A | | 11/1969 | Joyner et al. ............... 260/29.6 |
| 3,481,910 A | | 12/1969 | Bronson et al. ........... 260/78.4 |
| 4,058,647 A | * | 11/1977 | Inoue et al. ................ 428/474 |
| 4,097,548 A | | 6/1978 | Kulkarni et al. ............ 260/873 |
| 4,362,585 A | | 12/1982 | de Antonis et al. ......... 156/62.2 |
| 4,510,301 A | | 4/1985 | Levy .......................... 526/254 |
| 4,544,721 A | | 10/1985 | Levy .......................... 526/249 |
| 4,567,088 A | | 1/1986 | Skogman et al. ........... 428/213 |
| 4,612,155 A | | 9/1986 | Wong et al. ................ 264/176 |
| 4,677,017 A | | 6/1987 | de Antonis et al. ......... 428/214 |
| 4,751,270 A | | 6/1988 | Urawa et al. ............... 525/244 |
| 5,122,905 A | * | 6/1992 | Wheatley et al. ........... 428/213 |
| 5,139,878 A | | 8/1992 | Kim et al. ................... 428/421 |
| 5,658,670 A | * | 8/1997 | Fukushi et al. ............. 428/421 |
| 5,945,221 A | * | 8/1999 | Tsai et al. ................... 428/412 |
| 5,965,256 A | * | 10/1999 | Barrera ....................... 428/354 |

FOREIGN PATENT DOCUMENTS

| | | |
|---|---|---|
| DE | 28 30 344 | 1/1990 |
| DE | 40 22 741 | 1/1992 |
| EP | 0-132-583 | 2/1985 |
| EP | 0-637-509 | 2/1995 |
| FR | 2757444 | 6/1998 |
| GB | 1536233 | 12/1978 |

\* cited by examiner

*Primary Examiner*—Paul Thibodeau
*Assistant Examiner*—Monique R. Jackson
(74) *Attorney, Agent, or Firm*—Roger H. Criss

(57) ABSTRACT

The present invention provides halopolymer-containing multicomponent structures comprising at least one halopolymer layer and at least one adhesive layer. The adhesive layer comprises a base polymer having at least one functional moiety selected from the group consisting of unsaturated acids and anhydrides thereof, amines and epoxy compounds, wherein said adhesive layer has an ASTM D-2240 shore hardness number of less than about 25 in the D scale and less than about 75 in the A scale. Multicomponent structures such as films, tubing, sheet and injection molded and blow molded articles prepared with these adhesives exhibit superior adhesion as well as the excellent barrier properties typically associated with halopolymer-containing multicomponent structures. A method of improving the adhesion of halopolymers is disclosed as well.

34 Claims, No Drawings

MULTICOMPONENT STRUCTURES HAVING IMPROVED ADHESION

CROSS-REFERENCE TO RELATED APPLICATIONS

This application claims the benefit of U.S. provisional patent application Ser. No. 60/064,482, filed Nov. 6, 1997.

BACKGROUND OF THE INVENTION

1. Field of the Invention

This invention relates to multicomponent structures; and more particularly to multicomponent structures having improved adhesion.

2. Description of the Prior Art

It is known in the art to produce multicomponent structures to take advantage of different properties exhibited by the various components in the structure. Typical of multicomponent structures are multilayer films in which different layers have specific characteristics.

For example, in packaging applications, it is desirable to use fluoropolymers which are known for their inertness to most chemicals and resistance to high temperatures as well as low coefficients of friction. Polychlorotrifluoroethylene ("PCTFE") homopolymers and copolymers, and ethylene-chlorotrifluoroethylene ("ECTFE") alternating copolymers, are particularly advantageous due to their excellent barrier properties. However, use of such fluoropolymers is restricted to specialty packaging applications due to their relatively high cost.

A suitable means of reducing the cost of a packaging material fabricated from a costly polymer is to form multilayer structures in which the polymer layer is either coextruded or laminated with other, less costly, polymer layers. This approach is particularly desirable for fluoropolymer packaging applications since a thin layer of the fluoropolymer is often all that is needed to take advantage of the desirable properties of the fluoropolymers while minimizing the cost. However, fluoropolymers do not adhere strongly to most other polymers; in fact, most fluoropolymers are known for their non-stick characteristics.

Use of functionalized polyolefins as the adhesive layer in multicomponent structures has been described; see for example U.S. Pat. Nos. 4,677,017 and 5,139,878, the disclosure of which is expressly incorporated herein by reference. While these multilayer structures exhibit excellent moisture and barrier properties, in many instances, they lack sufficient adhesive strength to have any significant use. As a result, there are not yet any commercially available coextruded halopolymer films. It would therefore be desirable to provide an improved adhesive resin in order to provide superior multicomponent structures suitable for a wide variety of applications.

SUMMARY OF THE INVENTION

In accordance with this invention, there is provided a multicomponent structure comprising at least one halopolymer layer and at least one adhesive layer wherein the adhesive layer is a soft, modified polymer comprising a base polymer having at least one functional moiety selected from the group consisting of unsaturated acids and anhydrides thereof, amines and epoxy compounds, wherein said adhesive layer has an ASTM D-2240 shore hardness number of less than about 25 in the D scale and less than about 75 in the A scale. Preferably, the shore hardness number is less than about 20 in the D scale and less than about 72 in the A scale. It is also preferable that the adhesive be highly modified with the functional moiety. Adhesives which are modified with maleic anhydride are particularly advantageous in the practice of this invention. In a preferred embodiment, the multilayer structure is a three layer structure which, most preferably, is a three layer film.

It has unexpectedly been found that when soft polymers with a high degree of modification are used as the adhesive layer in halopolymer-containing multicomponent structures, a high degree of adhesion between the halopolymer and the soft, modified polymer exists.

DESCRIPTION OF THE PREFERRED EMBODIMENTS

The adhesive layer of the present invention is formed from a base polymer having a functional moiety, and has an ASTM D-2240 shore hardness number of less than about 25 in the D scale and less than about 75 in the A scale, which polymer has been modified with an unsaturated acid, anhydride, amine or epoxy moiety in an amount of from about 0.1% to about 20% by weight based on the total weight of the polymer. In a preferred embodiment, the shore hardness number is less than about 20 in the D scale and less than about 72 in the A scale. Shore hardness number is measured by the American Standard Test Method (ASTM) D-2240 which is well known to those skilled in the art. As used herein, shore hardness number is determined by the shore hardness test and is based on the penetration of a specific type of indentor when forced into specific materials under specific conditions. Shore hardness number is an inverse function of indentor extension which is dependent on the elastic modulus and viscoelastic behavior of the material. Thus, the softer a material, the lower shore hardness number. There are different types of durometers used in shore hardness tests, among which Type A and Type D are commonly reported. The difference of these two types are based on the shape of the indentor and the applied force. For example, an indentor of a Type D Durometer has a sharper point (i.e., 0.100±0.012 mm R) than a Type A Durometer (i.e., 0.79±0.03 mm R).

The functional moiety of the adhesive layer comprises from about 0.2% to about 15%, preferably from about 0.5% to about 10%, and most preferably from about 1% to about 5% by weight based on the total weight of the polymer. Any unsaturated acid or anhydride may be used as the functional moiety in this invention. Suitable acids include unsaturated carboxylic acids such as maleic acid, fumaric acid, crotonic acid, citraconic acid and itaconic acid. Suitable anhydrides include anhydrides of any of the foregoing. Of these, the most preferred is maleic anhydride. Suitable amines include aliphatic or aromatic, primary, secondary and tertiary amines. Specific examples include: 2,4,6-tribromoaniline, methylamine, ethylamine, propylamine, dimethylamine-N-methylanaline, ethylmethylamine, 2-(N-methylamine) heptane, sec-butyldimethylamine, N-ethyl-N-methylaniline, trimethylamine, and N,N-dimethylanaline. Suitable epoxy compounds are those having from about 2 to about 20 carbon atoms. In a particularly preferred embodiment, the adhesive layer comprises about 1% to about 5% of maleic anhydride.

Base polymers which are useful in the preparation of the adhesive layer include, but are not limited to, poly($\alpha$-olefin) homopolymers, copolymers, and mixtures thereof, and thermoplastic elastomers including styrenic block copolymers, olefinic elastomers, elastomeric alloys, thermoplastic polyurethanes, elastomeric polyesters and elastomeric polyamides.

Poly(α-olefin) homopolymers can be prepared from α-olefins having from about 2 to about 10 and preferably from about 2 to about 6 carbon atoms, and include polyethylene (including ultra low density, low density, linear low density, medium density, high and ultra high density), polypropylene, polybutylene, polybutene-1, polypentene-1, poly-3-methylbutane-1, poly-4-methylpentene-1, and polyhexene. Copolymers of two or more of the foregoing α-olefins or α-olefins and other monomers such as alkyl esters of α,β-ethylenically unsaturated carboxylic acids are useful in the practice of this invention, see for example, U.S. Pat. No. 5,139,878, the disclosure of which is expressly incorporated herein by reference.

Styrene block copolymers may be linear or branched and include styrene and butadiene (SBS), styrene and isoprene, styrene and ethylene-butylene (SEBS), and styrene and ethylene-propylene.

Suitable olefinic thermoplastic elastomers include ethylene propylene diene (EPDM) and ethylene propylene rubber.

Suitable elastomeric alloys include melt processable rubbers, thermoplastic vulcanizates, such as ethylene propylene rubber or nitrile rubber and polyolefin in which vulcanized rubber is intimately dispersed in the polyolefin matrix, and ethylene interpolymers, such as polyethylene alloyed with polypropylene or polyethylene where the polyethylene is crosslinked.

Suitable elastomeric polyesters include copolymers of polyester and polyether. Suitable polyesters include poly (ethylene terephthalate) (PET), poly(butylene terephthalate) (PBT) and PET/PBT copolyesters. Suitable polyethers are those having from about 2 to about 20 carbon atoms.

Suitable thermoplastic polyurethanes include polyester-based or polyether-based polyurethanes. Specific examples include Estane 58113 (polyester-based), Estane 58013 (polyether-based) and Estane 58880 (polyether-based) all available from B. F. Goodrich and Pellethane 2103-70A (polyether-based) elastomer available from the Dow Chemical Company.

Suitable elastomeric polyamides include copolymers of a polyamide and a polyether. Suitable polyamides include nylon 6, nylon 1, nylon 12, nylon 6,6, nylon 4,6, nylon 6,9, nylon 6,10, nylon 6,12, and nylon 6,6T. Suitable ethers are those having from about 2 to about 20 carbon atoms.

Preferred base polymers include olefinic thermoplastic elastomers, and poly(α-olefin) homopolymers, copolymers and mixtures thereof.

These base polymers can be substituted in any position with any of the following compounds: halogen (including chlorine, fluorine and bromine), oxygen and nitrogen.

A particularly effective composition is a ethylene-propylene elastomer (EP rubber) modified with about 2% to about 4% of maleic anhydride, comprising approximately 80% ethylene component and 20% propylene component in the overall composition. The ethylene-propylene elastomer can be either a copolymer or a blend with different levels of E/P composition and/or E/P sequence, in which at least one of the components in the blend is modified with unsaturated carboxylic acids and anhydrides. An example is a two-component blend, in which one component is an essentially EP random copolymer or ethylene-α-olefin copolymer without any modification, and the other is an EP block copolymer or crystalline polyethylene modified with a high level of maleic anhydride. The latter component can be also a terpolymer, consisting of ethylene, propylene, and maleic anhydride.

The soft, modified polymers of the invention can be prepared by conventional methods well known in the art, including, but not limited to, copolymerization and grafting processes. See, for example, U.S. Pat. Nos. 3,481,910; 3,480,580; 4,612,155; and 4,751,270, the disclosures of which are expressly incorporated herein by reference.

The halopolymers with which the soft, modified polymers can be used are known in the art and all are commercially available. They include, but are not limited to, fluoropolymers, chloropolymers and fluorochloropolymers having from about 2 to about 20 carbon atoms wherein at least one carbon atom in the polymer is substituted with at least one halogen atom.

Specific examples of suitable halopolymers include: PCTFE homopolymers and copolymers, ECTFE copolymer, ethylene tetrafluoroethylene copolymer, fluorinated ethylene-propylene copolymers (FEP), perfluoroalkoxy polymer (PFA), poly(vinylidene fluoride), poly(vinyl fluoride), poly(vinylidene chloride), poly(vinyl chloride), copolymers or blends of tetrafluoroethylene, and copolymers or blends of vinylidene fluoride and blends of 2 or more of the foregoing.

Preferred halopolymers include PCTFE homopolymers and copolymers, ECTFE copolymer, ethylene tetrafluoroethylene copolymer, fluorinated ethylene-propylene copolymers (FEP), copolymers or blends of tetrafluoroethylene, and copolymers or blends of vinylidene fluoride.

The soft modified polymers may be used with halopolymers to prepare multicomponent structures including coextruded articles such as film and tubing, laminates such as film and sheet, and injection and blow molded articles.

The soft modified polymers produced in accordance with the teachings herein are suitable for the manufacture of multicomponent structures and, in particular, multilayer films. The multilayer films may be prepared by methods well known in the art. (See e.g., U.S. Pat. No. 4,677,017, the disclosure of which is expressly incorporated herein by reference and the foregoing Examples) and may be oriented in one or both directions, or unoriented. (See U.S. Pat. No. 4,362,585, the disclosure of which is expressly incorporated herein by reference). The multilayer films include at least one halopolymer layer and at least one adhesive layer adjacent to the halopolymer layer. Suitable film structures include, but are not limited to: A/B/C, A/B/C/B/A and C/B/A/B/C wherein A is a halopolymer, B is an adhesive layer and C is a thermoplastic polymer. In a more preferred embodiment, the film structure has at least three layers; one halopolymer layer, one adhesive layer adjacent to the halopolymer and one thermoplastic polymer layer adjacent to the soft, modified polymer. PCTFE is a preferred halopolymer for these three layer films. Such a film is particularly useful in the packaging of pharmaceutical and other materials, such as those materials requiring blister packaging.

Thermoplastic polymers which may be added to the halopolymer/tie layer structure include polyamides such as crystalline and amorphous nylon, e.g. nylon 6 and MXD6 (available from Mitsubishi Gas Chemical Company, Inc.); polyesters such as poly(ethylene terephthalate), 1,4-cyclohexanedimethanol modified poly(ethylene terephthalate), poly(1,4-cyclohexanedimethylene terephthalate), poly(butylene terephthalate), poly(ethylene naphthalate) and poly(butylene naphthalate); polyolefins such as polyethylene, polypropylene and polybutene, and the other polyolefins mentioned above with respect to the base polymers; polyacrylonitrile, polystyrene, polyacrylates, poly(vinyl chloride), poly(vinylidene chloride), ethylene vinyl acetate, polyurethanes, and copolymers or blends thereof.

Naturally, other additives which are normally included in multicomponent structures can be included in the structures of this invention. They include UV absorbers and stabilizers, fillers, slip additives, antioxidants and heat stabilizers.

As noted above, the material of the invention can be used to prepare multicomponent structures other than film. These structures can be prepared by coextrusion, lamination, injection molding and blow molding. All of these processes are known in the art; see e.g. U.S. Pat. Nos. 5,139,878; 4,677,017; and 4,510,301, the disclosures of which are expressly incorporated herein by reference. For example, the multicomponent structures of the present invention can be used to prepare multicomponent tubing, either symmetrical of asymmetrical, which comprises at least one halopolymer layer and at least one adhesive layer adjacent to the halopolymer layer. In a preferred embodiment, the tubing comprises at least one halopolymer layer, at least one adhesive layer adjacent to the halopolymer layer and at least one thermoplastic polymer layer adjacent to the adhesive layer. Suitable structures for the tubing include, but are not limited to: A/B/C, A/B/C/B/A and C/B/A/B/C wherein A is a halopolymer, B is an adhesive layer and C is a thermoplastic polymer layer.

In another embodiment, the invention relates to a method of improving the adhesion of halopolymers to other polymers in multicomponent structures comprising utilizing a soft, modified polymer as an adhesive layer between the halopolymer and the other polymer.

It was surprisingly found that multicomponent structures produced in accordance with the teachings herein exhibited superior interlayer adhesion than multicomponent structures utilizing the adhesive resins of the prior art.

The following examples are presented to provide a more complete understanding of the invention. The specific techniques, conditions, materials proportions and reported data set forth to illustrate the principles and practice of the invention are exemplary and should not be construed as limiting the scope of the invention.

EXAMPLE 1

Three-layer films were coextruded from poly (chlorotrifluoro ethylene) (PCTFE) homopolymer (density: 2.11 gm/cc, melting point: 211° C., Aclar® HP from Allied-Signal Inc.), linear low density polyethylene ("LLDPE") (density: 0.920 gm/cc, melt index: 1.0 gm/10 min at 190° C. per ASTM D-1238, made by Dow Chemical Company) and an adhesive layer. The adhesive layer comprised either (1) a functionalized polyolefin (density: 0.89 gm/cc, melt index: 1.0 gm/10 min at 190° C., shore hardness in D scale of 21, and shore hardness in A scale of 76, containing by weight 68% ethylene, 25% propylene, 7% vinyl acetate, and less than 1% maleic anhydride, from Mitsui Chemicals America, Inc.) (Admer SF 700A) as a comparative example; (2) a blend of 75% functionalized polyolefin (1), 15 % of another lower melt index functionalized polyolefin (Admer AT 1276) (density; 0.888 gm/cc, melt index: 0.4 gm/10 min, shore hardness in D scale of 25, same composition as (1), also from Mitsui Chemicals America, Inc.), and 10% styrene-ethylene-butylene-styrene linear block copolymer (density: 0.92 gm/cc, shore hardness in A scale of 65, from Shell Chemical Company) (Kraton G 1657) (this blend has a shore hardness indicated in Table 1), also a comparative example; or (3) a highly functionalized polyolefin elastomer (density; 0.884 gm/cc, melt index: 0.4 gm/10 min, shore hardness in D scale of 20, and a shore hardness in A scale of 72, containing 78% ethylene, 19% propylene, and about 2–4% maleic anhydride, from Mitsui Chemicals America, Inc.) (Admer AT 1293).

The halopolymer layer was prepared by drying the PCTFE for four hours at 121° C. and extruding through a 3.2 cm (1.26 inch) diameter Killion single screw extruder (L/D= 24/1) equipped with three heating zones and two adapters. The extruder temperature profile was set at 277° C., 282° C. and 288° C. for zones 1–3, respectively. The adapters were maintained at 288° C. The melt temperature was 286° C.

The LLDPE layer, comprising a copolymer of ethylene and octene-1 with a density of 0.920 and a melt index (ASTM D-1238) of 1.0 gm/10 min. at 190° C., was prepared by extruding the polyethylene though a 3.8 cm (1½ inch) diameter Killion single screw extruder (L/D=24/1) equipped with three heating zones and two adapters. Heating zones 1–3 were maintained at 238° C., 249° C. and 260° C., respectively. The adapters were maintained at 260° C. The melt temperature was 256° C.

The tie resin was extruded through a 3.2 cm (1.26 inch) Killion single screw extruder equipped with four heating zones and two adapters. Heating zones 1–4 were maintained at 238° C., 249° C., 260° C. and 266° C., respectively. The adapters were maintained at 266° C. The resulting melt temperature was 263° C.

The multilayer structure was coextruded as a LLDPE/ adhesive layer/halopolymer structure and cast onto a casting roll maintained at 62° F. (17° C.) followed by a cooling roll maintained at about 80° F. (27° C).

The data obtained are set forth below in Table 1:

TABLE I

| Number Adhesive | Shore Hardness Number D-scale | Shore Hardness Anhydride A-scale | % of Maleic PCTFE Modification | Bond Strength gm/in (gm/cm) | |
|---|---|---|---|---|---|
| | | | | Tape on Both Side Only | Tape on Sides |
| comparative 1 | 21 | 76 | <1% | 81 (32) | 238 (94) |
| comparative 2 | 21 | 75 | <1% | 182 (72) | 486 (191) |
| 3 | 20 | 72 | 2–4% | 321 (126) | 561 (221) |

These data show that interlayer adhesion can be correlated with the "softness" (shore hardness number in both D scale and A scale) and the level of maleic anhydride modification of the adhesive layer. For soft materials, the shore hardness number is reported in A scale rather than in D scale due to better differentiation in the A scale. In this case, films prepared with adhesive layers having shore hardness in A scale of less than 75 (and a shore hardness in the D scale of less than 25) exhibit significant improvement in interlayer adhesion than the films prepared with "hard" adhesives having a low degree (i.e. <1%) of anhydride modification.

EXAMPLE 2

The multicomponent films described in Example 1 were prepared with ECTFE (an alternating copolymer, i.e., 50% ethylene, and 50% chlorotrifluoro ethylene, density: 1.68 gm/cc, melting point: 240° C., from Ausimont USA, Inc.) as the halopolymer and comparative adhesive (2) and adhesive (3), described in Example 1, as the adhesive layer. The data obtained are set forth below in Table 2:

TABLE 2

| Adhesive | Shore Hardness Number D-scale | Shore Hardness Number A-scale | % of Maleic Anhydride Modification | Bond Strength gm/in (gm/cm) Tape on ECTFE Side Only | Bond Strength gm/in (gm/cm) Tape on Both Sides |
|---|---|---|---|---|---|
| comparative 2 | 21 | 75 | <1% | 350 (138) | 550 (217) |
| 3 | 20 | 72 | 2–4% | 400 (157) | >650 (>256) |

These data also show that interlayer adhesion of halopolymers can be correlated with the "softness" (shore hardness number in both D scale and A scale) and the level of maleic anhydride modification of the soft, modified polymer adhesive. That is, soft modified adhesives exhibit superior bonding characteristics regardless of the halopolymer utilized in the multicomponent structure. Thus, interlayer adhesion is not halopolymer dependent but rather, is correlated with adhesive type.

EXAMPLE 3

To illustrate the correlation between adhesive strength and the softness, the multicomponent films described in Example 1 were prepared with a variety of comparative adhesives, all of which had shore hardness numbers higher than 25 in the D scale. The film prepared with ultra low density poly(ethylene) ("ULDPE") as the adhesive layer (Flexomer DEFA 1373 available from Union Carbide, density: 0.903, vicat softening temperature: 53° C. (ASTM D-1525), 0.3–0.6% maleic anhydride modification) having a shore hardness number of 40 in D scale exhibited 190 gm/in (75 gm/cm) bond strength with tape on both sides and 75 gm/in (30 gm/cm) bond strength with tape on the PCTFE side only. The film prepared with a linear low density poly(ethylene) ("LLDPE") as the adhesive layer (Admer NF500A available from Mitsui Chemicals America, Inc, density: 0.92 gm/in, vicat softening temperature: 86° C. (ASTM D-1525), less than 1% maleic anhydride modification) having a shore hardness number of 46 in D scale exhibited bond strength of 150 gm/in (59 gm/cm) with tape on both sides and 50 gm/in (20 gm/cm) with tape on the PCTFE side only. The film prepared with a poly(propylene) ("PP") as the adhesive layer (Admer QF500A available from Mitsui Chemicals America, Inc, density: 0.90 gm/cc, vicat softening temperature: 143° C. (ASTM D-1525), less than 1% maleic anhydride modification) having a shore hardness number of 67 in D scale exhibited 100 gm/in (39 gm/cm) bond strength with tape on both sides and 45 gm/in (18 gm/cm) with tape on the PCTFE side only. The film with an adhesive layer consisting of the Blend resin ("Blend"), described in U.S. Pat. No. 5,139,878, and comprising 60% of comparative tie resin 1 from Example 1 and 40% of an ethyl methyl acrylate copolymer (EMAC 2202 available from Chevron Chemical Company, density: 0.943, methyl acrylate content: 21 wt. %, vicat softening temperature 60° C. (ASTM D-1525) no maleic anhydride modification, shore hardness in D scale of 38) and having a shore hardness number of 28 in the D scale, exhibited 220 gm/in (87 gm/cm) bond strength with tape on both sides of the film and 75 gm/in (30 gm/cm) with tape on the PCTFE side only. The film having an adhesive layer comprising ethylene vinyl acetate (a maleic anhydride modified vinyl acetate as described in U.S. Pat. No. 4,677,017) ("EVA") (Bynel 3101 available from E.I. du Pont de Nemours and Company, about 18% vinyl acetate content, density: 0.943 gm/cc, vicat softening temperature: 650 C. (ASTM D-1525), less than 1% maleic anhydride modification) with a shore hardness number of 90 in A scale and about 33 in D scale exhibited 190 gm/in (75 gm/cm) bond strength with tape on both sides of the film and 70 gm/in (28 gm/cm) with tape on the PCTFE side only. Table 3 summarizes these results.

TABLE 3

| Adhesive Layer | Shore Hardness Number in A or D scale | Vicat Softening Temperature (ASTM D-1525) | % of Maleic Anhydride Modification | Bond Strength gm/in (gm/cm) Tape on PCTFE Side Only | Bond Strength gm/in (gm/cm) Tape on Both Sides |
|---|---|---|---|---|---|
| ULDPE | 40 in D scale | 53 | <1% | 75 (30) | 190 (75) |
| LLDPE | 46 in D scale | 86 | <1% | 50 (20) | 150 (59) |
| PP | 67 in D scale | 143 | <1% | 45 (18) | 100 (39) |
| Blend | 28 in D scale | — | <1% | 75 (30) | 220 (87) |
| EVA | 90 in A scale 33 in D scale | 65 | <1% | 70 (28) | 190 (75) |

As with Examples 1 and 2, these data show that interlayer adhesion can be correlated with the "softness" (shore hardness) and the level of anhydride modification of the modified adhesive layer. More specifically, modified adhesives having a shore hardness number in D Scale greater than 25 and low maleic anhydride modification (i.e., <1%) showed low adhesive strength, i.e., less than 220 gm/in (87 gm/cm) with tape on both sides, which is often insufficient for practical applications. By way of contrast, adhesive (3) from Examples 1 and 2, having a shore hardness number of less than 25 in the D scale and 75 in the A scale and having greater than 1% maleic anhydride modification, exhibit excellent bond strength. Thus, the soft modified adhesives exhibit markedly superior interlayer adhesion than their "harder" counterparts.

While not intending to be bound to a particular theory, it is believed that the acid-base interaction between the electronegative halides on the surface of the halopolymer and the acidic nature of the hydrolyzed anhydride make these soft, modified polymers good bonding agents.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A multicomponent structure comprising:
   a) at least one fluoropolymer layer; and
   b) at least one adhesive layer wherein said adhesive layer comprises a base polymer having at least one functional moiety selected from the group consisting of unsaturated acids or anhydrides thereof, amines and epoxy compounds, wherein said adhesive layer has an ASTM D-2240 shore hardness number of about 25 or less in the D scale and about 75 or less in the A scale.

2. The multicomponent structure of claim 1 wherein said multicomponent structure is a three layer structure.

3. The multicomponent structure of claim 1 wherein said multicomponent structure is a three layer film.

4. The multicomponent structure of claim 1 wherein said functional moiety of said adhesive layer is present in an amount of from about 0.1 to about 20 percent by weight based on the total weight of said adhesive layer.

5. The multicomponent structure of claim 1 wherein said functional moiety of said adhesive layer is present in an amount of from about 0.2 to about 15 percent by weight based on the total weight of said adhesive layer.

6. The multicomponent structure of claim 1 wherein said functional moiety of said adhesive layer is present in an amount of from about 0.5 to about 10 percent by weight based on the total weight of said adhesive layer.

7. The multicomponent structure of claim 1 wherein said functional moiety of said adhesive layer is present in an amount of from about 1 to about 5 percent by weight based on the total weight of said adhesive layer.

8. The multicomponent structure of claim 1 wherein said functional moiety of said adhesive layer is an unsaturated carboxylic acid.

9. The multicomponent structure of claim 1 wherein said functional moiety of said adhesive layer is an anhydride of an unsaturated carboxylic acid.

10. The multicomponent structure of claim 1 wherein said functional moiety of said adhesive layer is maleic anhydride.

11. The multicomponent structure of claim 1 wherein said functional moiety of said adhesive layer is selected from the group consisting of aliphatic primary, secondary and tertiary amines and aromatic primary, secondary and tertiary amines.

12. The multicomponent structure of claim 1 wherein said functional moiety of said adhesive layer is an epoxy having from about 2 to about 20 carbon atoms.

13. The multicomponent structure of claim 1 wherein said base polymer of said adhesive layer is selected from the group consisting of poly($\alpha$-olefin) homopolymers, copolymers and mixtures thereof, and thermoplastic elastomers.

14. The multicomponent structure of claim 13 wherein said base polymer is a poly($\alpha$-olefin) homopolymer having from about 2 to about 10 carbon atoms.

15. The multicomponent structure of claim 13 wherein said base polymer is a poly($\alpha$-olefin) homopolymer having from about 2 to about 6 carbon atoms.

16. The multicomponent structure of claim 13 wherein said base polymer is a thermoplastic elastomer selected from the group consisting of styrenic block copolymers, olefinic elastomers, elastomeric alloys, thermoplastic polyurethanes, elastomeric polyesters, and elastomeric polyamides.

17. The multicomponent structure of claim 16 wherein said base polymer is a styrenic block copolymer selected from the group consisting of linear and branched copolymers.

18. The multicomponent structure of claim 16 wherein said base polymer is a olefinic thermoplastic elastomer is selected from the group consisting of ethylene propylene diene and ethylene propylene rubber.

19. The multicomponent structure of claim 16 wherein said base polymer is an elastomeric alloy selected from the group consisting of melt processable rubbers, thermoplastic vulcanates and ethylene interpolymers.

20. The multicomponent structure of claim 16 wherein said base polymer is a thermoplastic urethane is selected from the group consisting of polyester-based polyurethanes and polyether-based polyurethanes.

21. The multicomponent structure of claim 16 wherein said base polymer is a elastomeric polyester which is a copolymer of a polyester and a polyether.

22. The multicomponent structure of claim 16 wherein said base polymer is a elastomeric polyamide which is a copolymer of a polyamide and a polyether.

23. The multicomponent structure of claim 1 wherein said fluoropolymer is selected from the group consisting of poly(chlorotrifluoroethylene) homopolymers and copolymers, ethylene chlorotrifluoroethylene copolymer, ethylene tetraflouroethylene copolymer, fluorinated ethylene-propylene copolymer, perfluoroalkoxy polymer, poly(vinylidene fluoride), poly(vinyl fluoride), copolymers or blends of tetrafluoroethylene, copolymers or blends of vinylidene fluoride, and blends of two or more of the foregoing.

24. The multicomponent structures of claim 1 wherein said fluoropolymer is a poly(chlorotrifluoroethylene) homopolymer or copolymer.

25. The multicomponent structure of claim 1 wherein said fluoropolymer is a poly(chlorotrifluoroethylene) homopolymer.

26. The multicomponent structure of claim 1 further comprising at least one thermoplastic layer.

27. The multicomponent structure of claim 26 wherein said thermoplastic layer is selected from the group consisting of polyamide, polyester, polyolefin, polyacrylonitrile, polystyrene, polyacrylate, poly(vinyl chloride), poly(vinylidene chloride), ethylene vinyl acetate, polyurethane, and copolymers or blends of two or more of the foregoing.

28. The multicomponent structure of claim 26 wherein said thermoplastic layer is a polyolefin.

29. The multicomponent structure of claim 1 wherein said adhesive layer has a shore hardness number about 20 or less in the D scale and less than about 72 in the A scale.

30. A multilayer film comprising the multicomponent structure of claim 1.

31. The multilayer film of claim 30 wherein said multilayer film is oriented.

32. A multicomponent structure comprising:
   a) at least one poly(chlorotrifluoroethylene) homopolymer or copolymer layer;
   b) at least one adhesive layer wherein said adhesive layer comprises a base polymer having at least one functional moiety selected from the group consisting of unsaturated acids or anhydrides thereof, amines and epoxy compounds, wherein said adhesive layer has an ASTM D-2240 shore hardness number of about 25 or less in the D scale and about 75 or less in the A scale; and
   c) at least one polyolefin thermoplastic layer.

33. A multilayer film comprising the multicomponent structure of claim 32.

34. A method of improving the adhesion of fluoropolymers to other polymers in a multicomponent structure comprising the use of an adhesive layer between said fluoropolymer and said other polymer, said adhesive layer comprising a base polymer having at least one functional moiety selected from the group consisting of unsaturated acids and anhydrides thereof, amines and epoxy compounds, said adhesive layer having an ASTM D-2240 shore hardness number of about 25 or less in the D scale and about 75 or less in the A scale.

* * * * *